(12) United States Patent
Konersmann et al.

(10) Patent No.: US 8,032,880 B2
(45) Date of Patent: Oct. 4, 2011

(54) MULTI-BRANCH MANAGEMENT FOR UPDATING SOFTWARE

(75) Inventors: Scott A. Konersmann, Sammamish, WA (US); Arulkumar Elumalai, Lynnwood, WA (US); Maxwell D. Myrick, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/275,254

(22) Filed: Dec. 20, 2005

(65) Prior Publication Data

US 2007/0169101 A1 Jul. 19, 2007

(51) Int. Cl.
*G06F 9/44* (2006.01)
(52) U.S. Cl. ........ 717/170; 717/168; 717/169; 717/171; 717/172; 717/173
(58) Field of Classification Search .................. 717/168, 717/169, 170, 171, 172, 173
See application file for complete search history.

(56) References Cited

U.S. PATENT DOCUMENTS

| 2002/0053044 A1* | 5/2002 | Gold et al. ...................... 714/38 |
| 2004/0107416 A1* | 6/2004 | Buban et al. .................. 717/170 |
| 2004/0181790 A1* | 9/2004 | Herrick .......................... 717/168 |

OTHER PUBLICATIONS

Futakata, Atsushi; Sep. 1995; "Patch Control Mechanism for Large Scale Software"; USENIX Association; Ninth System Administration Conference; pp. 1-14.*
Katz, Randy H.; Dec. 1990; "Toward a Unified Framework for Version Modeling"; ACM; vol. 22, No. 4; pp. 376-408.*

* cited by examiner

*Primary Examiner* — Emerson Puente
*Assistant Examiner* — Jonathan R Labud (57) ABSTRACT

A system for managing updates of an executable component in accordance with an updating tree with multiple branches is provided. In one implementation, specific updates are provided to users with specific problems while general updates are provided to all users of the executable component. A range of lower version numbers is reserved for the general updates. When a specific update with a version number higher than those in the reserved range has been installed on a computing device, an installer may prevent a new general update with a lower version number to be installed. The installer may determine a new specific update corresponding to the general update and provide an indication to the user to install this new specific update instead of the general update. This multi-branch update delivery system enables users to elect to receive only updates that are necessary.

20 Claims, 6 Drawing Sheets

MULTI-BRANCH MANAGEMENT FOR UPDATING SOFTWARE

BACKGROUND

Complex software products are often extensively tested before being released to ensure their performance, stability, and compatibility with other software. However, even after intensive testing, some bugs will inevitably remain in the software products at the time of release. Also, it may not be possible to detect platform specific issues and compatibility issues that can only become apparent after installation.

To address issues associated with software products after they have been released, updates, such as patches, may be provided to customers to resolve these issues. Software patches may be classified into two categories: private patches and public patches. A private patch may be provided by the software developer to one or a few particular customers that are working with the developer on a particular urgent problem associated specifically to the particular customers. Typically, the private patch is tested to make sure that the problem is fixed and is provided to the customers in an expedited manner. Because of the short turnaround time, comprehensive testing often cannot be done. In contrast, a public patch typically addresses issues with a software product that affects most or all customers. These issues may involve security, data corruption issues, or the like. Generally, software developer broadly distributes a public patch and encourages all customers to install the patch. Public patches usually take months to ship and are tested more thoroughly since the patches have a much broader customer impact.

Patching typically involves a linear progression of the product over time. The progression is linear because there is a single branch that holds the product build system, such as sources, data and tools, for the released product. Particularly, a new public patch to a software product typically contains the contents of all previous released private and public patches. Updating software products with a linear progression model may cause problems for customers. For example, customers that install a public patch may have to assume the risk of having new issues caused by previously released private patches that are particularly designed to solve specific issues on another customer's system. Also, the software product installed on the customers' systems may be highly tuned to attain optimal efficiency. Installing a public patch with unnecessary modifications may substantially degrade the performance of the software product.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system that manages updates of an executable component in accordance with an updating tree with multiple branches. In one implementation, specific updates are provided to users with specific problems while general updates are provided to all users of the executable component. A range of lower version numbers is reserved for the general updates. When a specific update with a version number higher than those in the reserved range has been installed on a computing device, an installer may prevent a new general update with a lower version number to be installed. The installer may determine a new specific update corresponding to the general update and provide an indication to the user to install this new specific update instead of the general update. This multi-branch update delivery system enables users to elect to receive only updates that are necessary.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for updating software with multi-branch management, the system described is provided as an example and not a limitation. As those skilled in the art will appreciate, the present examples are suitable for application in a variety of different types of systems that are capable of managing and providing updates only to users that specifically need them.

Figure 1:
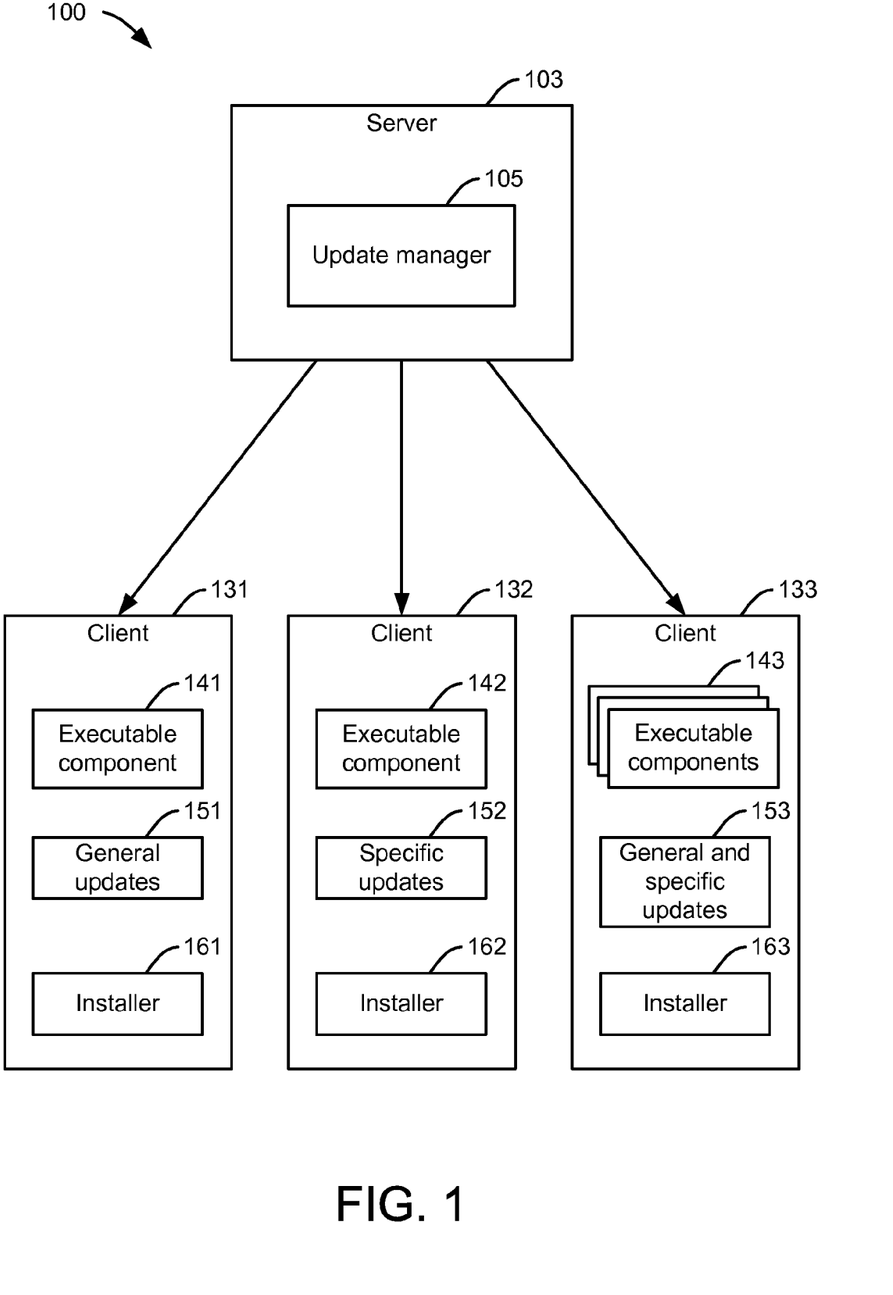
FIG. 1 shows an example system for updating software with multi-branch management.

FIG. 1 shows an example system 100 for updating software with multi-branch management. Server 103 is a computing device that includes update manager 105. Update manager 105 is configured to provide updates for an executable component, such as an application, an operating system or the like. Updates may include patches, hotfixes, general distributable releases, or the like. As shown in FIG. 1, executable components 141-143 are distributed copies of the executable component managed by update manager 105 and are installed on client computing devices 131-133.

Update manager 105 is configured to provide general updates and specific updates to clients 131-133. Specific updates are released for problems specific to one or a few users of the executable component. Typically, specific updates are not necessary for other users that do not have the specific problems. General updates are released for problems or improvements that are applicable to all users. General updates and specific updates are organized into separate update branches. A client may elect to be on the general update branch so that the client does not have to install specific updates that are not applicable. An example multi-branch updating tree will be discussed below in conjunction with FIG. 2.

Clients 131-133 may install updates using installers 161-163, which may be provided by update manager 105. Installers 161-163 may be provided along with each update or as executable components that resides on the clients. Installers 161-163 may be configured to determine whether a general update or a specific update should be installed. Installers 161-163 may make this determination by identifying the updating branch on which a client is operating. Installers 161-163 may make this identification by examining the version number associated with the updates that have already been installed on the client. An example multi-branch update version numbering system will be discussed below in conjunction with FIG. 3.

As shown by the example system 100 in FIG. 1, client 131 is on a general update branch and includes general updates 151 while client 132 is on a specific update branch and includes specific updates 152. Client 133 includes multiple instances of executable components 143 and both general and specific updates 153. Some instances of the executable components 143 are on the general update branch while other instances are on the specific update branch.

The example system 100 shown in FIG. 1 is just one particular implementation that is described for illustrative purpose. Other systems may be implemented to perform the same functionalities as example system 100. For example, a multi-branch software updating system may be implemented without server 103. In this implementation, clients 131-133 may acquire general and specific updates through CD's, web downloads, and other distribution mechanisms.

Figure 2:
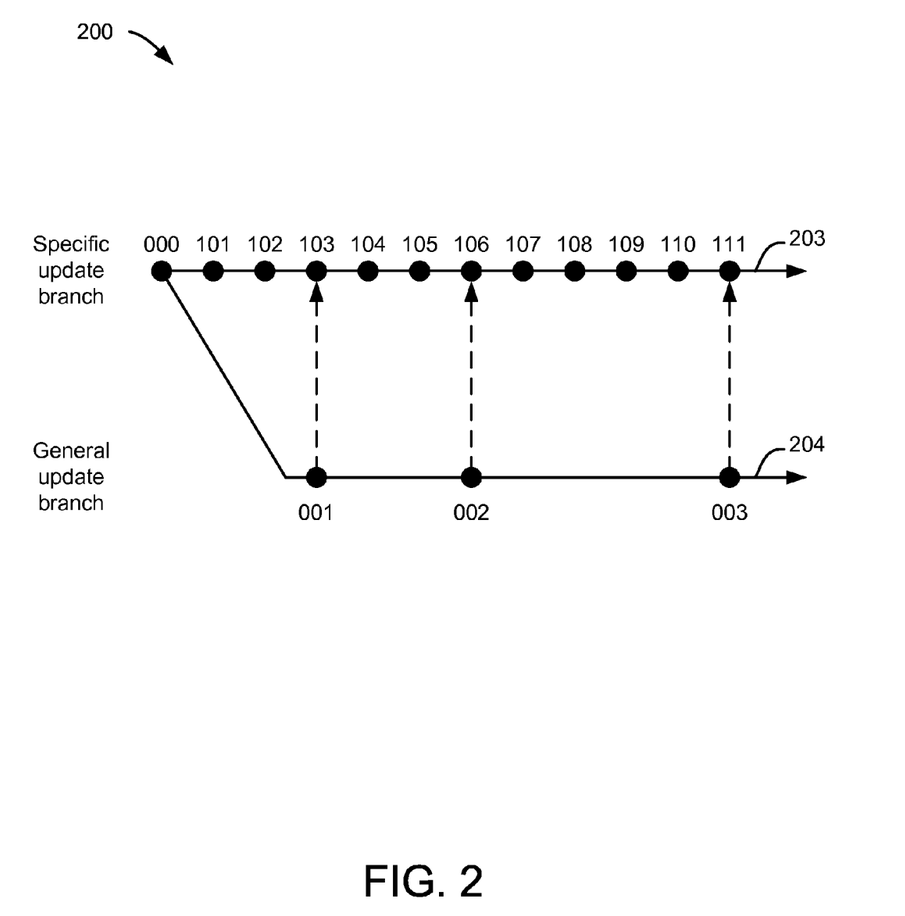
FIG. 2 shows an example multi-branch updating tree.

FIG. 2 shows an example multi-branch updating tree 200. Example tree 200 includes a general update branch 204 and a specific update branch 203. Update tree 200 begins at point 000 representing a baseline version of an executable component. The baseline version can be the executable component at release to manufacturing (RTM), after a service pack, or the like.

After point 000, one or more particular users may experience a problem that requires a specific fix. These users are typically major customers of the executable component and the developer of the executable component is receptive to provide a specific fix for these major customers' specific problem. As shown in FIG. 2, a specific update 101 may be released to the one or more particular users to resolve a specific problem. Specific update 101 is typically not required for other users that do not have the particular problem that requires the specific fix. These other users generally include the majority of the users of the executable component.

When another problem that requires a specific fix occurs, specific update 102 may be released to resolve this other problem. Specific update 102 includes the content of specific update 101 that fixed the previous problem. Thus, updates on specific update branch 203 are cumulative and the last specific update includes the solutions provided by all of the previous specific updates on specific update branch 203.

When a problem or improvement affects all users of the executable component, a general update 001 is released. In this example, general update 001 does not include the fixes in specific updates 101 and 102. The users that have not installed specific updates 101 and 102 may install general update 001 and operate on the general update branch 204. For users that have already installed specific updates 101 and 102, general update 001 should not be installed since it may revert the specific fixes in updates 101-102. In this situation, an update manager is configured to provide specific update 103, which is associated with general update 001. Specific update 103 includes the specific fixes provided by specific updates 101 and 102 as well as the fixes in general update 001. In this manner, users that are on specific update branch 203 may preserve the specific fixes in updates 101 and 102 while benefiting from general fixes in update 001.

For ease of illustration, the number labels for general updates 001-003 and specific updates 101-111 also represent the version numbers of the updates. Thus, in the example update tree 200 shown in FIG. 2, specific update branch 203 includes 11 specific updates of versions 101-111 and general update branch 204 includes 3 general updates of versions 001-003. General updates 001-003 correspond to specific updates 103, 106 and 111, respectively.

An installer for updates is configured to determine whether a particular update can be installed on a client. The installer is also configured to identify the association between a general update and a specific update. In one implementation, the installer determines the update branch to which the client is operating and whether the newly available update is compatible with that branch. The installer may make the determination by identifying previously installed updates and their version numbers and comparing these numbers with the version number on the newly available update. For example, if a client has previously installed specific updates of versions 101 and 102 and is attempting to install general update 001, the installer will determine that the client cannot install general update 001. The installer may simply determine that the version number of 001 of the general update is smaller than the last previously installed update version 102. Alternatively, an identifier may be used to directly indicate which update branch on which the client belongs. The installer may also determine that general update 001 corresponds to specific update 103 and may provide an indication to the user to install update 103 instead.

In another example, a client has previously installed general update version 001. If the client selected to install a previously provided specific update such as specific update 102, the installer is configured to determine that specific update 102 is not the appropriate update. Particularly, the installer is configured to determine that general update 001, which has already been installed on the client, corresponds to specific update 103. Thus, if the client desires the fix in specific update 102, the client should install specific update 103, which contains the latest fixes from both specific update branch 203 and general update branch 204. The installer may provide an indication to the user to install update 103.

The example multi-branch updating tree 200 in FIG. 2 is just one implementation shown as an example. Other implementations that provide substantially the same functionalities are also within the scope of the current disclosure. For example, although only two branches are included in multi-branch updating tree 200, an updating tree may include more than two branches to further enable updates to be specifically provided only to users that need the updates to fix specific problems of the executable component.

Figure 3:
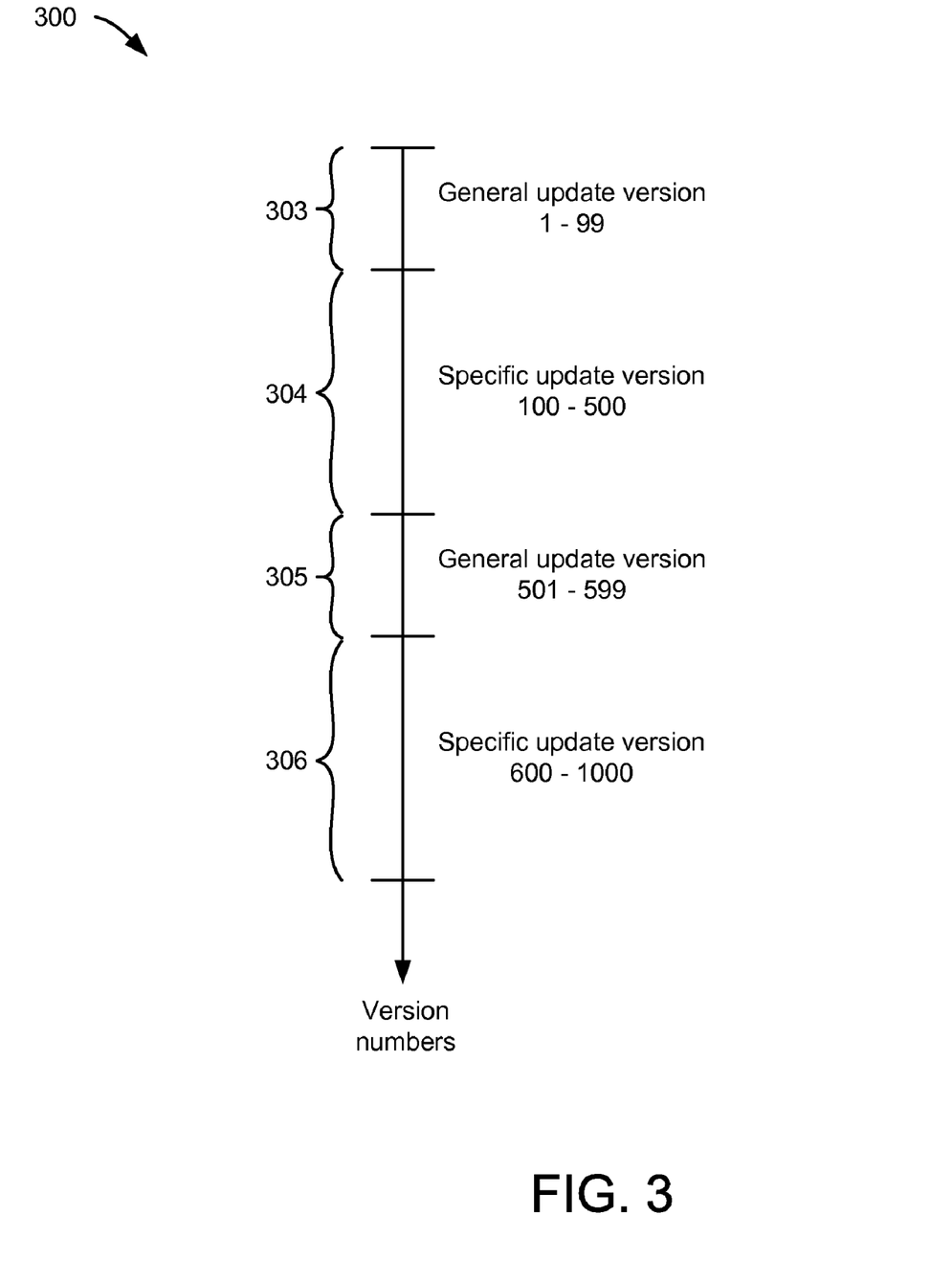
FIG. 3 shows an example multi-branch update version numbering system.

FIG. 3 shows an example multi-branch update version numbering system 300. The version numbers in example system 300 are used to identify updates for an executable component. Typically, updates that are released first are specific updates and have version numbers in range 304. Range 303 serves as a gap for separating specific updates and general updates, and includes version numbers that are reserved for general updates. Having separate ranges of version numbers for general updates and specific updates allows the maintenance of a multi-branch updating tree, such as the example tree 200 shown in FIG. 2. In the event that the amount of general or specific updates exceeds the amount of version numbers allocated by ranges 303 and 304, new ranges 305 and 306 may be created to maintain the separation of the update branches.

In one example implementation, the multi-branch updating management system described above is used to manage updates for a Structured Query Language (SQL) system. Updates for the SQL system include general distributable releases (GDRs), which are released to all customers, and hotfixes, which are provided to specific customers to resolve problems that are specific to those customers. In this example implementation, a gap of reserved version numbers is created between baseline (RTM or service pack) and the first hotfix. When a GDR is required, it is shipped with an unused reserved version number. Some example general behaviors are shown below:
- a) GDRs do not overwrite hotfixes because the hotfix versions are higher.
- b) GDRs overwrite lower versioned GDRs.
- c) Hotfixes overwrite lower versioned hotfixes.

For the special behaviors, installers of GDR and hotfixes are configured to understand that branching is enabled:
- a) For every GDR that is shipped, a hotfix is also created that contains all the previous hotfix changes plus the GDR change.
- b) When installing a hotfix if a GDR is currently installed, the installer ensures that the hotfix version associated with the GDR is lower than the hotfix being installed.

Below shows an example update sequence assuming that the patch build version started at 1 and a 100 build gap.
RTM
GDR 1 (associated with hotfix 103)
  Unused
  Unused
  . . .
  Hotfix 100
  Hotfix 101
  Hotfix 102
Hotfix 103 (associated with GDR 1)

This schema allows for answering the question "Does this instance have a GDR, a hotfix, or neither applied" by simply doing a file version range check for the known reserved numbers.

In the case that the reserved numbers are exhausted, a new range of reserved numbers is created above the existing hotfixes. Below shows an example
  Existing ranges
    1-99 are reserved.
    100-500 are used by hotfixes
  A new gap is created
    501-599 is reserved
    600 is the next hotfix number Since the installers only need to know the reserved numbers that existed when they were shipped because everything newer is higher versioned, everything behaves correctly.

To rebaseline a product, another gap is created between the current highest hotfix and the baseline number. The size of the gap is based on the estimation of how many hotfixes will need to be shipped on the previous baseline (N, N−1 servicing). None of the N−1 patches will install over the baseline because of simply version checking.

GDR may determine the hotfix version to which the GDR is associated. In one example implementation, an extended file header entry for the update may be used. For example, AssociatedHotfixVersion may be used to identify the version.

In another example implementation, an entry in a registry can also be used to identify the version number.

In a further example implementation, a part of the build number in the GDR binaries may be used to identify the associated hotfix version. Below is an example where the $4^{th}$ build number is used:
  Major.Minor.GDR version.Associated Hotfix version In the example above where the GDR version is 1 and the associated hotfix version is 103, a SQL 2000 file version would be: 2000.08.1.103. Whenever the associated hotfix version is needed, it can be retrieved from the file version information. A registry key may also be used for identifying the associated hotfix version.

A GDR installer is configured to improve the user experience during invalid hotfix installations. For example, the GDR installer is configured to know the reserved number ranges at the time it was shipped. The GDR installer is also configured to know the version number of its associated hotfix. The associated hotfix version number can be retrieved from the file version number of the GDR. If the GDR installer determines that there is a hotfix on the machine and the version number is less than the associated hotfix number, the installer reports the hotfix version that the customer needs to install.

A hotfix installer is configured with logic to prevent out of order installs and regression of security fixes. For example, the hotfix installer is configured to know the reserved number ranges at the time it was shipped. The hotfix can use the reserved number ranges to determine if the instance has a hotfix or GDR installed. If a GDR is currently installed on the machine, the hotfix installer is configured to check the version of the hotfix associated with the GDR. If the GDR's associated hotfix version is higher than the hotfix being installed, a message is provided to the user indicating the minimum hotfix level that should be provided.

An example scenario is that a GDR 1 has been installed that is associated with hotfix 103. That means that only hotfix 103 and above can install over GDR 1. If a user tries to install hotfix 102, the hotfix installer checks the version number of the instance. If the version is a reserved number, the hotfix installer checks if the associated version number registry key is less than the version being installed. If so, the hotfix proceeds. Otherwise, an error message is displayed with the associated version number value from the GDR installed on the machine. In this case, a message would be displayed, indicating that the user needs to install hotfix version 103 or higher.

A baseline shipped after branching has been issued may be configured to overwrite all previous GDR and hotfix versions. The baseline may also delete the GDR associated hotfix registry key if the Registry option is implemented. No changes are needed in baselines prior to branching.

Below are some examples of scenarios of typical uses:
a) GDR installed on RTM
  RTM is build version 0
  GDR is build version 1 and AssociatedHotfixBuild version 101
  Simple version checking allows the install to proceed.
  Registry key AssociatedHotfixBuild 101 is written (for the Registry option).
b) GDR installed on GDR
  Starting with GDR installed on RTM
  GDR build version 2 and AssociatedHotfixBuild version 102
  Simple version checking allows the install to proceed.
  Registry key AssociatedHotfixBuild 102 is written (for the Registry option).

c) Hotfix installed on RTM
RTM is build version 0
Hotfix is build version 102
Simple version checking allows the install to proceed.
d) GDR installed on a Hotfix
Starting with Hotfix installed on RTM
GDR is build version 1 and AssociatedHotfixBuild version 101
Simple version checking blocks the installation (1<102)
e) Hotfix installed on GDR
Starting with GDR installed on RTM
Hotfix is build version 102
Hotfix detects that a GDR is installed on the machine
Hotfix looks up the registry that contains the AssociatedHotfixBuild value (for the Registry option).
If the AssociatedHotfixBuild value is lower than hotfix 102 the installation proceeds. Otherwise it is blocked.
f) Hotfix installed on hotfix
Starting with Hotfix installed on RTM
Hotfix is build version 105
Simple version checking allows the install to proceed.
g) Baseline (Service Pack) installed on hotfix
Starting with Hotfix installed on RTM
Baseline checks major/minor version and ignores build number to determine applicability.
The AssociatedHotfixBuild registry key is deleted (for the Registry option.
h) Baseline Installed on QFE
Starting with GDR installed on RTM
Baseline checks major/minor version and ignores build number to determine applicability.
The AssociatedHotfixBuild registry key is deleted (for the Registry option.

Figure 4:
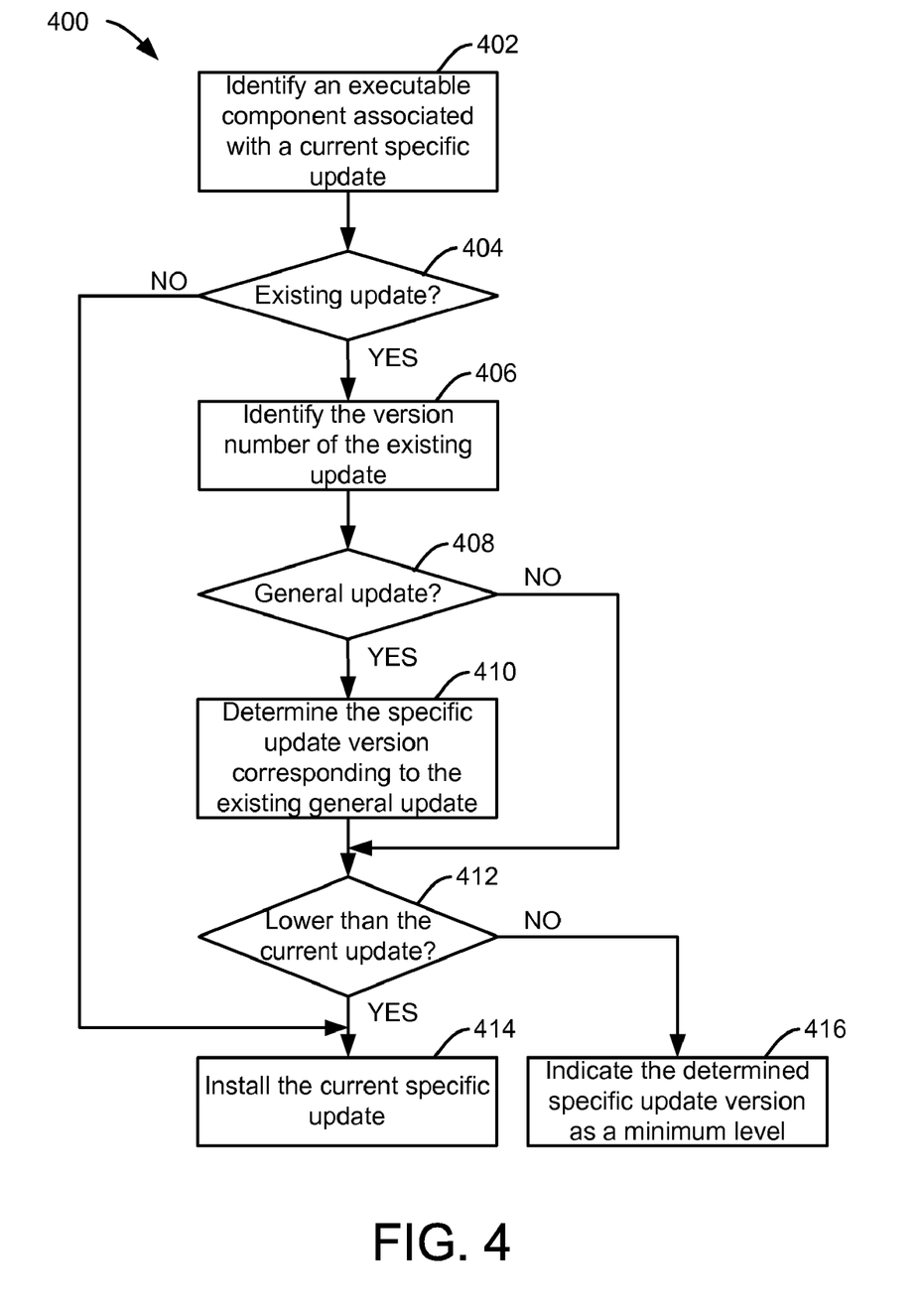
FIG. 4 shows an example process for installing a specific update for an executable component.

FIG. 4 shows an example process 400 for installing a specific update for an executable component. Example process 400 may be implemented by an installer for installing a specific update, such as a hotfix, onto a computing device. At block 402, the executable component associated with the specific update currently available for installation is identified. At decision block 404, a determination is made whether one or more updates exist for the executable component. If no, process 400 moves to block 414.

Returning to decision block 404, if at least one update exists for the executable component, process 400 moves to block 406 where the version number of the existing update is identified. The version number may be identified by any method, such as from a build number associated with the previously installed update, a registry key, a version number identifier data structure, or the like. At decision block 408, a determination is made whether the last existing update is a general update. For example, the installer may be configured to know a version number range that has been reserved for general update. If the version number of the existing update exceeds this range, then the version number indicates that the existing update is a specific update. In this case, process 400 goes to decision block 412.

Returning to decision block 408, if the existing update is a general update, process 400 moves to block 410 where the specific update version corresponding to the existing general update is determined. At decision block 412, a determination is made whether the existing update version is lower than the current update. If so, at block 414, the current specific update is installed onto the computing device. If the version number of the existing update is not lower than the current update, then installing the current update may revert the existing fixes already on the computing device and should not be done. In this case, process 400 moves to block 416 where the determined specific update version is indicated as a minimum required update version level.

Figure 5:
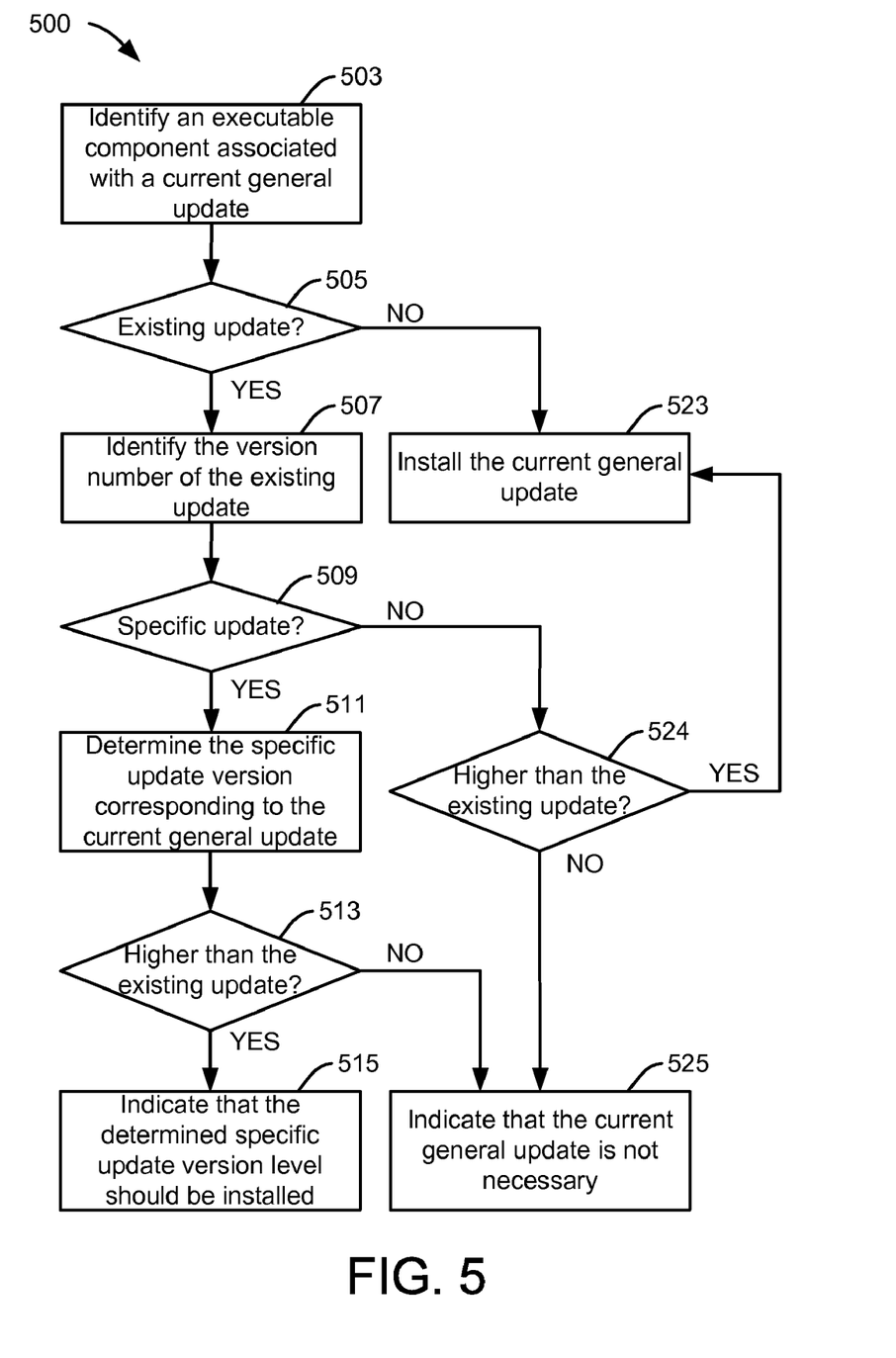
FIG. 5 shows an example process for installing a general update for an executable component.

FIG. 5 shows an example process 500 for installing a general update for an executable component. Example process 500 may be implemented by an installer for installing a general update, such as a GDR, onto a computing device. At block 503, the executable component associated with the general update currently available for installation is identified. At decision block 505, a determination is made whether one or more updates associated with the executable component have already been installed. If not, process 500 moves to block 523 where the general update is installed.

Returning to decision block 505, if at least one update exists for the executable component, process 500 moves to block 507 where the version number of the last existing update is identified. At decision block 509, a determination is made whether the existing update is a specific update. If not, then the existing update is a general update. Process 500 goes to decision block 524 where a determination is made whether the version of current general update is higher than the existing general update. If so, process 500 goes to block 523 where the general update is installed. If the version of current general update is not higher than the existing general update, process 500 moves to block 525 where the installer indicates to the user that the current general update is not necessary.

Returning to decision block 509, if the existing update is a specific update, process 500 goes to block 511 where the specific update version corresponding to the current general update is determined. At decision block 513, a determination is made whether the determined specific update version corresponding to the current general update is higher than the version of the existing specific update. If so, process 500 moves to block 515 where the installer indicates to the user that the determined specific update version level corresponding to the current general update should be installed. If the determined specific update version corresponding to current general update is higher than the version of the existing specific update, process 500 goes to block 525 where the installer indicates to the user that the current general update is not necessary.

Figure 6:
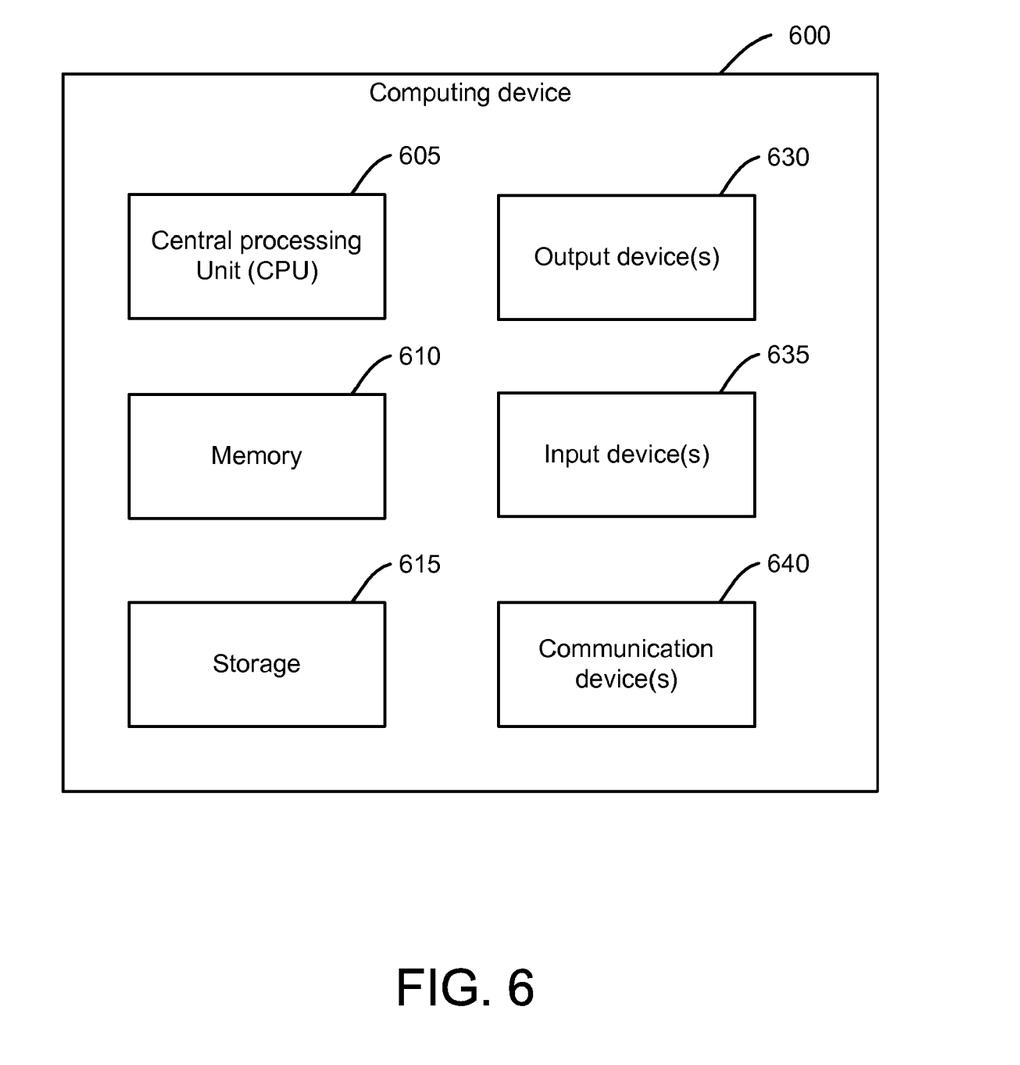
FIG. 6 shows an example computer device for implementing the described systems and methods.

FIG. 6 shows an example computer device 600 for implementing the described systems and methods. In its most basic configuration, computing device 600 typically includes at least one central processing unit (CPU) 605 and memory 610.

Depending on the exact configuration and type of computing device, memory 610 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 615. Computer storage media includes volatile and nonvolatile, removable and non-removable media implemented in any method or technology for storage of information such as computer readable instructions, data structures, program modules or other data. Memory 610 and storage 615 are all examples of computer storage media. Computer storage media includes, but is not limited to, RAM, ROM, EEPROM, flash memory or other memory technology, CD-ROM, digital versatile disks (DVD)

or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 640 that allow the device to communicate with other devices. Communications device(s) 640 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 635 such as keyboard, mouse, pen, voice input device, touch input device, etc. Output device(s) 630 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more device-readable storage media encoded with device-executable instructions for performing steps comprising:
   receiving a new update having a version number, the new update being for an executable component;
   identifying whether the new update is in a general updating branch or a specific updating branch based on whether the version number of the new update is in a range of version numbers reserved for the general updating branch;
   in an instance where the received new update is in the general updating branch:
      determining that individual specific updates of the specific updating branch have been previously installed on a first client device and have not been previously installed on a second client device;
      responsive to the determining:
         preventing installation of the received new update on the first client device so that only further updates of the specific updating branch are installed on the first client device; and
         installing the received new update on the second client device.

2. The one or more device-readable storage media as recited in claim 1, further comprising device-executable instructions for performing further steps comprising:
   in the instance where the received new update is in the general updating branch, determining a corresponding specific update in the specific updating branch; and
   installing the corresponding specific update on the first client device in an instance where the corresponding specific update has a version that is higher than a version associated with the individual specific updates of the specific updating branch that were previously installed on the first client device.

3. The one or more device-readable storage media as recited in claim 2, further comprising device-executable instructions for performing further steps comprising:
   providing an indication that the received new update is not necessary if the version of the corresponding specific update is not higher than the version associated with the individual specific updates of the specific updating branch that were previously installed.

4. The one or more device-readable storage media as recited in claim 2, the version associated with the individual specific updates of the specific updating branch that were previously installed being identified by at least one of a file version number or a registry key.

5. The one or more device-readable storage media as recited in claim 1, version numbers in the range of version numbers reserved for the general updating branch being lower than version numbers for the individual specific updates.

6. The one or more device-readable storage media as recited in claim 1, further comprising device-executable instructions for performing further steps comprising:
   obtaining a new specific update for the first client device that includes both specific fixes included in the previously installed individual specific updates and fixes of the general update.

7. The one or more device-readable storage media as recited in claim 1, the new update comprising a general distributable release.

8. A method comprising:
   receiving a new update having a version number, the new update being for an executable component;
   identifying that the new update is a new general update from a general updating branch based on the version number;
   determining that a first client device is associated with a specific updating branch and a second client device is associated with the general updating branch, individual specific updates of the specific updating branch having been previously installed on the first client device;
   responsive to the determining:
      preventing installation of the new general update on the first client device and installing a further specific update from the specific updating branch on the first client device; and
      installing the new general update on the second client device.

9. The method according to claim 8, the further specific update of the specific updating branch installed on the first client device and the new general update installed on the second client device including a common fix.

10. The method according to claim 8, at least partly performed by an installer that executes on the first client device and the second client device.

11. The method according to claim 8, the further specific update being installed on the first client device in instances where a version number of the further specific update is higher than version numbers of the individual specific updates.

12. The method according to claim 8, further comprising:
indicating to a user of the first client device that the further specific update should be installed instead of the new general update.

13. The method according to claim 8, further comprising:
installing a second further specific update on the second client device after the new general update is installed on the second client device.

14. The method according to claim 13, the second further specific update having a version higher than a version of an individual specific update associated with the new general update.

15. A system comprising:
an installer configured to:
receive a new update having a version number, the new update being for an executable component installed on both a first client device and a second client device;
identify that the new update is a new general update from a general updating branch based on the version number;
determine that the first client device is associated with a specific updating branch and the second client device is associated with the general updating branch, individual specific updates of the specific updating branch being previously installed on the first client device;
prevent installation of the new general update on the first client device and, instead, cause a further specific update from the specific updating branch to be installed on the first client device; and
cause the new general update to be installed on the second client device; and
one or more computing devices configured to execute the installer.

16. The system according to claim 15, the one or more computing devices configured to execute the installer including the first client device.

17. The system according to claim 15, the one or more computing devices configured to execute the installer including the second client device.

18. The system according to claim 15, further comprising an update manager configured to provide the new update to the installer.

19. The system according to claim 18, the update manager executing remotely from the installer.

20. The system according to claim 15, the new general update being an instance of the executable component.

* * * * *